(12) United States Patent
Tabarovsky et al.

(10) Patent No.: US 8,965,704 B2
(45) Date of Patent: Feb. 24, 2015

(54) APPARATUS AND METHOD FOR FORMATION RESISTIVITY MEASUREMENTS IN OIL-BASED MUD USING A FLOATING REFERENCE SIGNAL

(75) Inventors: Leonty A. Tabarovsky, Cypress, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 483 days.

(21) Appl. No.: 13/359,608

(22) Filed: Jan. 27, 2012

(65) Prior Publication Data
US 2013/0030707 A1 Jan. 31, 2013

Related U.S. Application Data

(60) Provisional application No. 61/469,920, filed on Mar. 31, 2011.

(51) Int. Cl.
*G01V 1/40* (2006.01)
*G01V 3/00* (2006.01)
*G01V 3/24* (2006.01)
*E21B 47/10* (2012.01)

(52) U.S. Cl.
CPC ............... *G01V 3/24* (2013.01); *E21B 47/102* (2013.01)
USPC ........................................... 702/11; 324/355

(58) Field of Classification Search
USPC .......... 702/11, 1–2, 7, 16, 57, 64–67, 72–73, 702/75, 81, 127, 188–189; 324/323, 324/347–348, 351, 354–355, 357, 363, 324/366–368; 73/152.01–152.02, 152.17
See application file for complete search history.

(56) References Cited

U.S. PATENT DOCUMENTS

| | | |
|---|---|---|
| 3,579,098 A | 5/1971 | Mougne |
| 4,019,125 A | 4/1977 | Daniel |
| 4,837,518 A | 6/1989 | Gard et al. |
| 5,056,067 A | 10/1991 | Drumheller |
| 5,869,968 A | 2/1999 | Brooks et al. |
| 6,225,806 B1 | 5/2001 | Millar et al. |
| 7,119,544 B2 | 10/2006 | Hayman et al. |

(Continued)

OTHER PUBLICATIONS

Notification of Transmittal of the International Search Report and the Written Opinion of the International Searching Authority, or the Declaration; PCT/US2012/031419; Oct. 31, 2012.

(Continued)

*Primary Examiner* — Toan Le
(74) *Attorney, Agent, or Firm* — Cantor Colburn LLP

(57) ABSTRACT

Disclosed is an apparatus for estimating a property of an earth formation penetrated by a borehole containing an oil-based drilling fluid. The apparatus includes an electrode disposed at a carrier and configured to inject alternating current into the formation. An electrically conductive plate is disposed between the first electrode and a borehole wall. An electrical insulator is disposed between and contacts the first electrode and the conductive plate. The apparatus is configured to prevent the drilling fluid from being disposed between the first electrode and the conductive plate. A first sensor is used to measure an electric field established between the first electrode and the conductive plate. A processor is configured to receive a measurement of the electric field to use as a floating reference signal to determine a phase difference with respect to a measured electrical quantity related to the injected electrical current in order to estimate the property.

19 Claims, 3 Drawing Sheets

(56) References Cited

U.S. PATENT DOCUMENTS

| | | | |
|---|---|---|---|
| 2001/0043066 | A1 | 11/2001 | Hawkes et al. |
| 2002/0153897 | A1 | 10/2002 | Evans et al. |
| 2003/0122547 | A1 | 7/2003 | Prammer |
| 2004/0046559 | A1 | 3/2004 | Flanagan |
| 2005/0067190 | A1 | 3/2005 | Tabanou et al. |
| 2005/0068036 | A1 | 3/2005 | Wang et al. |
| 2006/0055418 | A1 | 3/2006 | Ogilvy et al. |
| 2007/0239403 | A1 | 10/2007 | Hornbostel |
| 2007/0285073 | A1 | 12/2007 | Nishida |
| 2008/0040042 | A1 | 2/2008 | Page |
| 2009/0072833 | A1* | 3/2009 | Tabarovsky ............ 324/355 |
| 2009/0306896 | A1 | 12/2009 | Forgang et al. |

OTHER PUBLICATIONS

Notification of Transmittal of the International Search Report and the Written Opinion of the International Searching Authority, or the Declaration; PCT/US2012/031421; Oct. 31, 2012.

Notification of Transmittal of the International Search Report and the Written Opinion of the International Searching Authority, or the Declaration; PCT/US2012/031424; Nov. 1, 2012.

Notification of Transmittal of the International Search Report and the Written Opinion of the International Searching Authority, or the Declaration; PCT/US2011/058113; Jun. 29, 2012.

L. San Matin et al, Oil-Based Mud Imaging Tool Generates High Quality Borehole Images in Challenging Formation and Borehole Condition, Including Thin Beds, Low Resistive Formations, and Shales, Conference Paper, May 25-28, 2008, 5 pages, Society of Petrophysicists and Well-Log Analysts.

Lofts, J., A New Micro-Resistivity Imaging Device for Use in Oil-Based Mud, Conference Paper, 2002, 14 pages, Society of Petrophysicists and Well-Log Analysts.

Mezzatesta A.G. et al, Integrated 2-D Interpretation of Resistivity Logging Measurements by Inversion Methods, Conference Paper, 1995, 8 pages, Society of Petrophysicists and Well-Log Analysts.

Mezzatesta A.G. et al, Integrated Interpretation of Galvanic and Induction Measurements by Inversion Methods, Conference Paper, Mar. 11-14, 1995, 9 pages, Society of Petroleum Engineers.

Mezzatesta, A.G. et al, Simultaneous Inversion of Galvanic and Induction Logging Measurements to Improve Resolution, Conference Paper, Apr. 27-29, 1994, 15 pages, Society of Petroleum Engineers.

* cited by examiner

APPARATUS AND METHOD FOR FORMATION RESISTIVITY MEASUREMENTS IN OIL-BASED MUD USING A FLOATING REFERENCE SIGNAL

CROSS REFERENCE TO RELATED APPLICATIONS

This application claims the benefit of an earlier filing date from U.S. Provisional Application Ser. No. 61/469,920 filed Mar. 31, 2011, the entire disclosure of which is incorporated herein by reference.

BACKGROUND

1. Field of the Invention

The present invention relates to the analysis of underground earth formations, and, more particularly, to the determination of formation resistivity.

2. Description of the Related Art

Boreholes are drilled into the earth for many applications such as hydrocarbon production, geothermal production, and carbon dioxide sequestration. In order to efficiently use expensive resources requires for drilling the boreholes, it is important for analysts to acquire detailed information related to the geologic formations being drilled.

Resistivity imaging is one type of process for obtaining the detailed information. In resistivity imaging, both electrical and induction resistivity instruments can be used. The resistivity of a formation is measured as a function of depth using a resistivity tool disposed in a borehole penetrating the formation. Variations in the resistivity are plotted or displayed to provide an image of the formation.

In electrical resistivity imaging, one or more transmitter electrodes are used to inject an electric current into an earth formation. Measurement electrodes, sometimes referred to as button electrodes, sink these currents and perform electrical measurements that are used to determine the resistivity of the earth formation. Because the transmitter and transmitter electrodes are deployed in a drilled borehole having variations in diameter due to the drilling process, the electrodes may not make contact with the borehole wall. The space or distance between an electrode and the borehole wall is referred to as the "standoff." Variations in the standoff could negatively affect quality of acquired resistivity images. Moreover, when using oil-based drilling mud, the drilling mud may enter a standoff and this could make measurement conditions even worse and result in erratic images. It would be well received in the art if the quality of resistivity images could be improved when using oil-based drilling mud.

BRIEF SUMMARY

Disclosed is an apparatus for estimating a property of an earth formation penetrated by a borehole containing an oil-based drilling fluid. The apparatus includes an electrode disposed at a carrier and configured to inject alternating current into the formation. An electrically conductive plate is disposed between the first electrode and a borehole wall. An electrical insulator is disposed between and contacts the first electrode and the conductive plate. The apparatus is configured to prevent the drilling fluid from being disposed between the first electrode and the conductive plate. A first sensor is used to measure an electric field established between the first electrode and the conductive plate. A processor is configured to receive a measurement of the electric field to use as a floating reference signal to determine a phase difference with respect to a measured electrical quantity related to the injected electrical current in order to estimate the property.

Also disclosed is a method for estimating a property of an earth formation penetrated by a borehole containing oil-based drilling fluid. The method includes: conveying a carrier through the borehole; injecting alternating electrical current into the formation using a first electrode disposed at the carrier; measuring an electric field established between the first electrode and an electrically conductive plate for use as a floating reference signal using a sensor, the electrically conductive plate being disposed between the first electrode and a wall of the borehole, an electrical insulator being disposed between and in contact with the first electrode and the electrically conductive plate wherein the first electrode, the electrically conductive plate and the electrical insulator are configured to prevent the drilling fluid from being disposed between the first electrode and the electrically conductive plate; and determining a phase difference between the floating reference signal and a measured electrical quantity related to the injected electrical current using a processor in order to estimate the property.

Further disclosed is a non-transitory computer readable medium having computer executable instructions for estimating a property of an earth formation penetrated by a borehole containing oil-based drilling fluid by implementing a method that includes: injecting electrical current into the formation using an electrode; measuring an electric field established between the first electrode and an electrically conductive plate for use as a floating reference signal, the electrically conductive plate being disposed between the first electrode and a wall of the borehole, an electrical insulator being disposed between and in contact with the first electrode and the electrically conductive plate wherein the electrode, the electrically conductive plate and the electrical insulator are configured to prevent the drilling fluid from being disposed between the first electrode and the electrically conductive plate; and determining a phase difference between the floating reference signal and a measured electrical quantity related to the injected electrical current in order to estimate the property.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
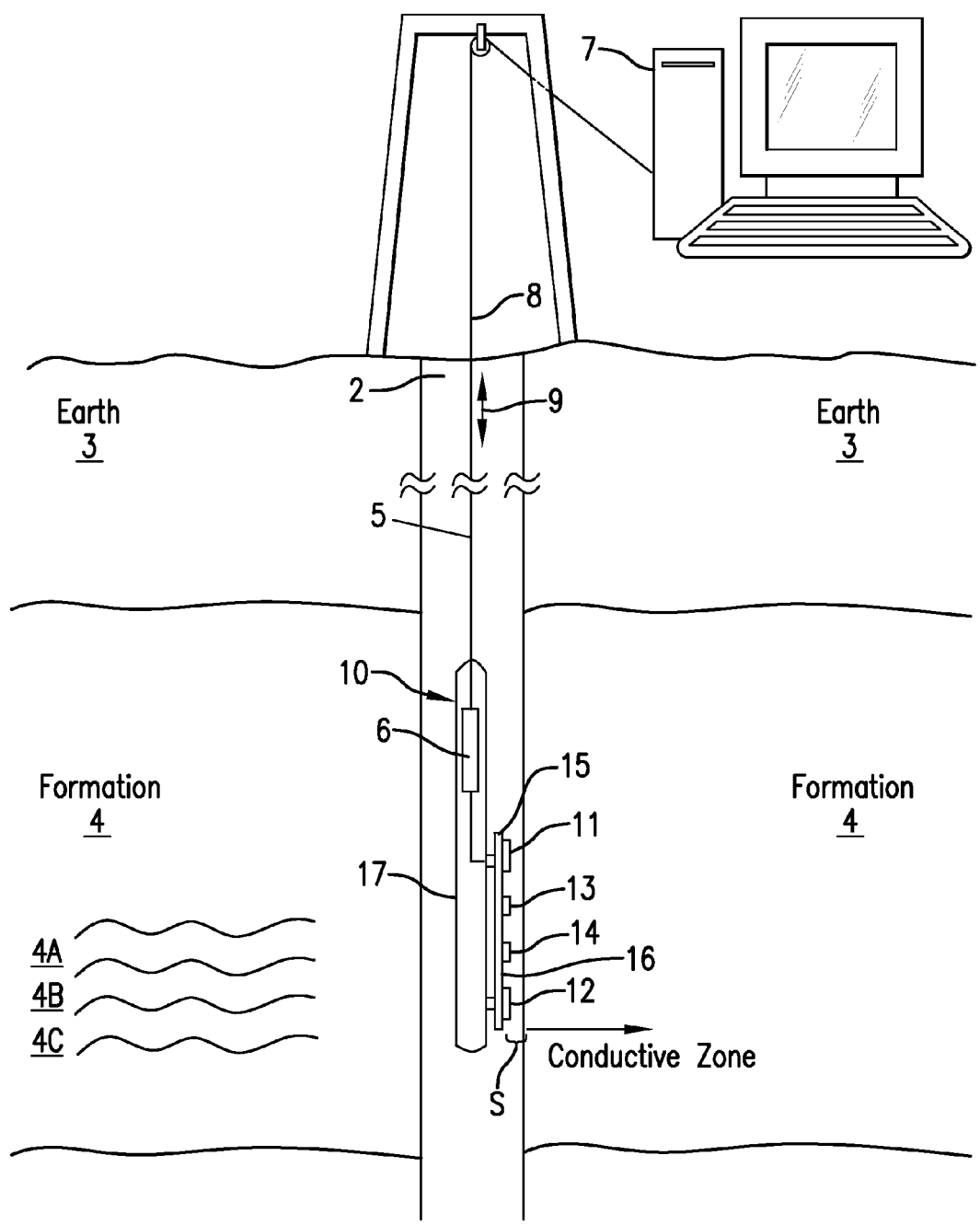
FIG. 1 illustrates an exemplary embodiment of a downhole resistivity tool disposed in a borehole penetrating the earth.

Reference may now be had to FIG. 1 illustrating an exemplary embodiment of a downhole tool 10 disposed in a borehole 2 penetrating the Earth 3, which includes an earth formation 4. The earth formation includes layers 4A, 4B, and 4C. The downhole tool 10 is conveyed through the borehole 2 by a carrier 5. In the embodiment of FIG. 1, the carrier 5 is an armored wireline 8. Besides supporting the downhole tool 10 in the borehole 2, the wireline 8 can also provide communications (e.g., data 9) between the downhole tool 10 and a computer processing system 7 disposed at the surface of the earth 3. In logging-while-drilling (LWD) or measurement-while-drilling (MWD) embodiments, the carrier 5 can be a drill string. In order to operate the downhole tool 10 and/or provide a communications interface with the computer processing system 7, the downhole tool 10 includes downhole electronics 6.

Still referring to FIG. 1, the downhole tool 10 is configured to measure the resistivity, or its inverse conductivity, of the formation 4. To measure the resistivity, the downhole tool 10 includes a first transmitter electrode 11, a second transmitter electrode 12, a first current measurement electrode 13 (also referred to as the first button electrode 13), and a second current measurement electrode 14 (also referred to as the second button electrode 14), all disposed on a pad 15. The electrodes 11-14 are separated by narrow insulating gaps 16. Because transmitter electrodes 11 and 12 are generally driven by the same transmitter electronics and thus are held at the same potential, the overall electrode configuration may be referred to as a two-button electrode configuration (i.e., referring to a transmitter electrode and button electrode). The pad 15, in one embodiment, is configured to be extended from the downhole tool 10 to make contact with the wall of the borehole 2. The portion of the wall of the borehole 2 at which resistivity measurements are performed may be referred to as a conductive zone due to electrical currents being injected and measured in this zone using the above-mentioned electrodes.

A voltage V applied to the transmitter electrodes 11 and 12 allows electrical current F from the periphery of the pad 15 to be injected into the formation 4. Then, upon its return to the pad 15 from the formation 4, current F is measured by the button electrodes 13 and 14.

It can be appreciated that the downhole tool 10 can have a plurality of pads 15 symmetrically arranged about the tool 10 so that they can extend in unison to contact the wall and provide mutual support to each other to maintain minimal standoff from the wall.

The downhole tool 10 operating in boreholes filled with non-conductive oil-based drilling fluid can conduct measurements using alternating current to overcome impedance introduced by both "standoff" and mud invasion zone. The currents are injected by transmitter electrodes driven by a voltage source at frequency $f=\omega/2\pi$. Measurements are based on the sensing of that component of electric current flowing through the measurement electrodes that is in-phase with the signal of the voltage source. By convention, this in-phase component of the measured current is called the "real" component of the measured current. In addition, by convention, electrode separation from the borehole wall together with the above-mentioned invasion zone is referred to as tool "standoff," shown as S in FIG. 1. The electrode separation and the invasion zone are electrically connected in series and they both present high impedance to injected electrical current prior to it entering the geologic formation. Uneven standoffs of transmitter and measurement electrodes in a resistivity tool can cause erratic resistivity images in oil-based drilling mud.

Different standoffs between the measurement electrodes cause strong cross currents between the measurement electrodes that primarily affect the phase of the measured current. Alteration of the phase results in a leakage of the non-informative imaginary component of the current into the real component of the current, hence, causing inaccurate or erratic measurements of the resistivity.

Certain measurement techniques may be established for detection of formation resistivity independent of the oil-filled gap thickness, gap material resistivity, and other properties affecting the gap impedance. As one example, it is assumed that a return electrode (shown as tool mandrel 17) is very large compared to the transmitter and measurement electrodes 11-14 such that the ground impedance to the return may be neglected.

In general, all measured electrical quantities depend on different voltage drops and phase delays along the current flow path. Both voltage drops and phase delays are functions of the overall system that includes the tool design, the standoff impedance and the formation resistivity. Because of the phase delays, currents measured by the button electrodes 13 and 14 have to be referenced to a reference parameter.

It is desired to perform measurements of current and voltage at such time when the voltage drop U across the standoff equals zero. When voltage drop U equals zero, the impedance measured by the transmitter or button electrodes 11-14 does not depend on the properties of the standoff such as thickness, resistivity, and dielectric permittivity. Hence, the voltage drop U may be used as a reference signal when U crosses the zero voltage point. A reference signal for galvanic resistivity imaging and logging depends on the properties of the formation 4 and the standoff. By having the reference signal vary in accordance with variations in the standoff properties, the variations in the standoff properties will be compensated for automatically. In this manner, the downhole tool 10 uses a floating reference signal to automatically compensate for any gap or standoff variations to provide measurements that are much more sensitive to formation resistivity.

Figure 2:
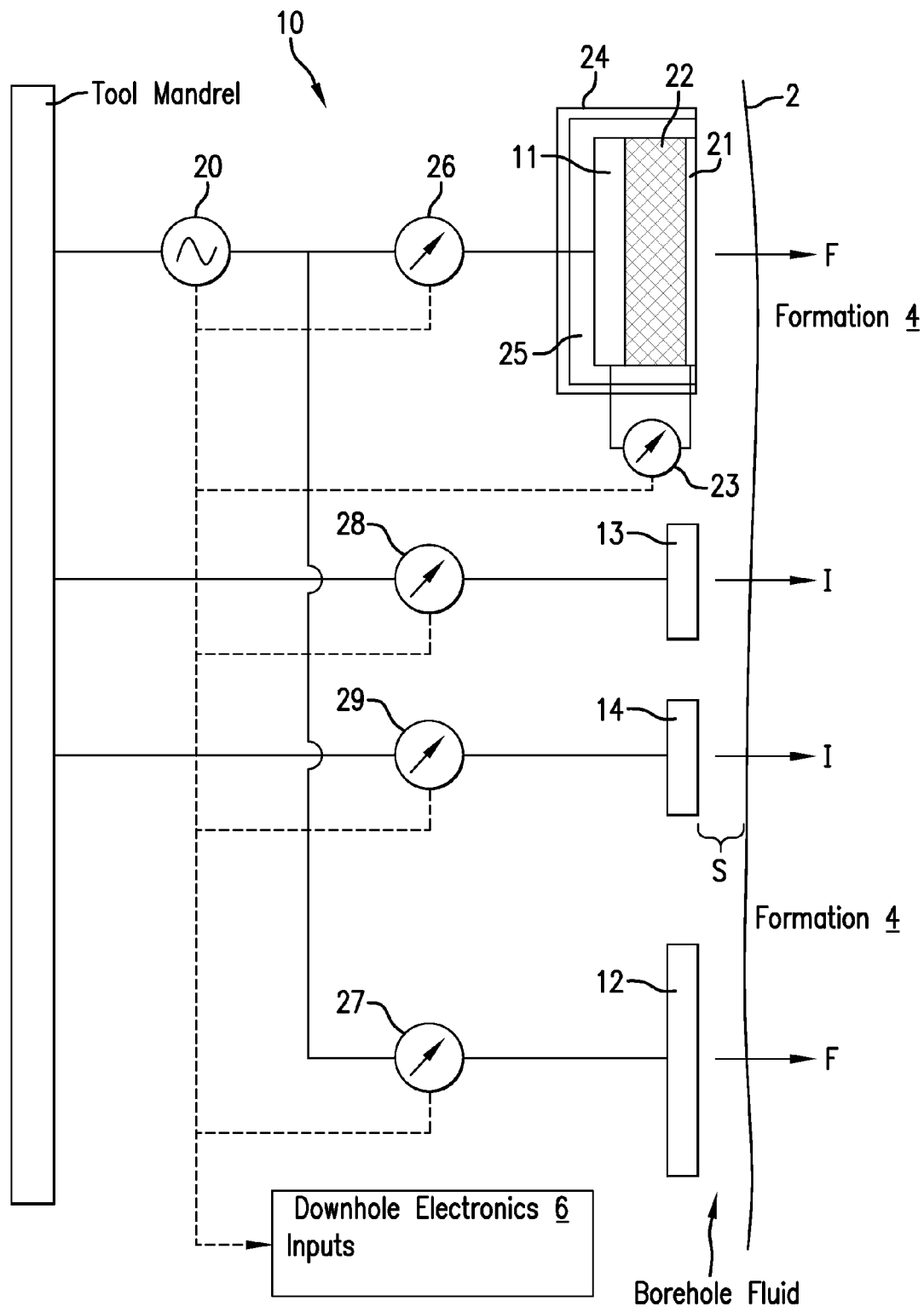
FIG. 2 depicts aspects of the downhole resistivity tool configured to provide a floating reference signal.

Reference may now be had to FIG. 2 depicting aspects of the downhole tool 10 incorporating measurement techniques for detection of formation resistivity independent of standoff effects. The downhole tool 10 depicted in FIG. 2 has a two-button configuration. The disclosed techniques are also applicable to other button configurations.

A voltage source 20 is coupled to the transmitter electrode 11 and is configured to inject voltage V into the transmitter electrode 11. Disposed between the transmitter electrode 11 and a wall of the borehole 2 is an electrically conducting plate 21, which can be a metal plate. An electrical insulator (i.e., an electrically insulating material) 22 is disposed between the transmitter electrode 11 and the electrically conducting plate 21. The electrical insulator 22 is in contact with the electrode 11 and the plate 21. The electrical insulator 22 represents oil-based drilling fluid, which is also an electrically insulating material. A sensor 23, such as a voltage sensor, is coupled to the transmitter electrode 11 and the electrically conducting plate 21 and measures the electric field established between the electrode 11 and the plate 21. The phase of the electric field is exactly the same as the phase of the electric field in the gap or standoff between the pad 15 and the wall of the borehole 2. Output from the sensor 23 correlates to the intensity and polarity of the electric field and is used as the floating reference signal.

The downhole tool 10 is configured to prevent any borehole fluids from entering between the transmitter electrode 11 and the electrically conducting plate 21 and, thus, prevent any borehole fluids or matter from contaminating the electrical insulator 22. In the embodiment shown in FIG. 2, the transmitter electrode 11, the electrical insulator 22, and the electrically conductive plate 21 are disposed in a sealed chamber 24. In one embodiment, parts or portions of one or more of the electrode 11, the insulator 22, and the plate 22 are incorporated into a body of the chamber 24. An insulating frame 25 is disposed within the chamber 24 and is configured to support the electrode 11, the insulator 22, and the plate 22.

In one or more embodiments, the radial extension of the chamber 24 is smaller than the axial and azimuthal of the electrodes 11-14. With this type of configuration, the electric field at the plate 21 will be almost normal to the surface of the plate 10 and, consequently, the plate 21 will be transparent with respect to the electric field produced by the transmitting electrode 11. Hence, the electric field produced by the transmitting electrode 11 in the presence of the plate 21 is the about the same as without the plate 21. The phase shift between the current injected by the transmitter electrode 21 and the electric field in the gap or standoff equals with an opposite sign, the phase of the complex conductivity of the drilling fluid.

Still referring to FIG. 2, an electrical sensor 26 is coupled to the transmitting electrode 11. The sensor 26 is configured to measure an electrical property of the transmitting electrode 11 such as current flow or voltage. In one embodiment, a voltage measurement is performed when the floating reference signal is zero. Similarly, an electrical sensor 27 is coupled to the transmitting electrode 12. An electrical sensor 28 is coupled to the measurement electrode 13 and is configured to measure an electrical property of the measurement electrode 13 such as current flow or voltage. Similarly, an electrical sensor 29 is coupled to the measurement electrode 14. The voltage source 20 and the electrical sensors 26-28 are coupled to the downhole electronics 6. The downhole electronics 6 include processing circuits for receiving as inputs various electrical measurements performed by sensors in the downhole tool 10. A processor in the downhole electronics 6 or the surface computer processing system 7 can process the various electrical measurements with respect to the floating reference signal to estimate the resistivity of the formation 4 as a function of depth using the principles discussed above.

It can be appreciated that the transmitter electrode 12 can also be used in conjunction with an individual electrically conductive plate 21 and an individual electrical insulator 22 and, thus, provide another floating point reference signal. Similarly, the measurement electrodes 13 and 14 can be used in conjunction with individual electrically conductive plates 21 and individual electrical insulators 22 and, thus, provide multiple floating point reference signals. In one or more embodiments, a single electrically conductive plate 21 and a single electrical insulator 22 can be used in conjunction with the electrodes 11-14. With the single plate 21 and the single insulator 22, measurements are performed on the electric field in front of each electrode (i.e., between each electrode and the single plate 21). The advantage of using multiple floating reference signals is the ability to account for standoff variations that are more closely spaced as a function of depth in the borehole 2.

Figure 3:
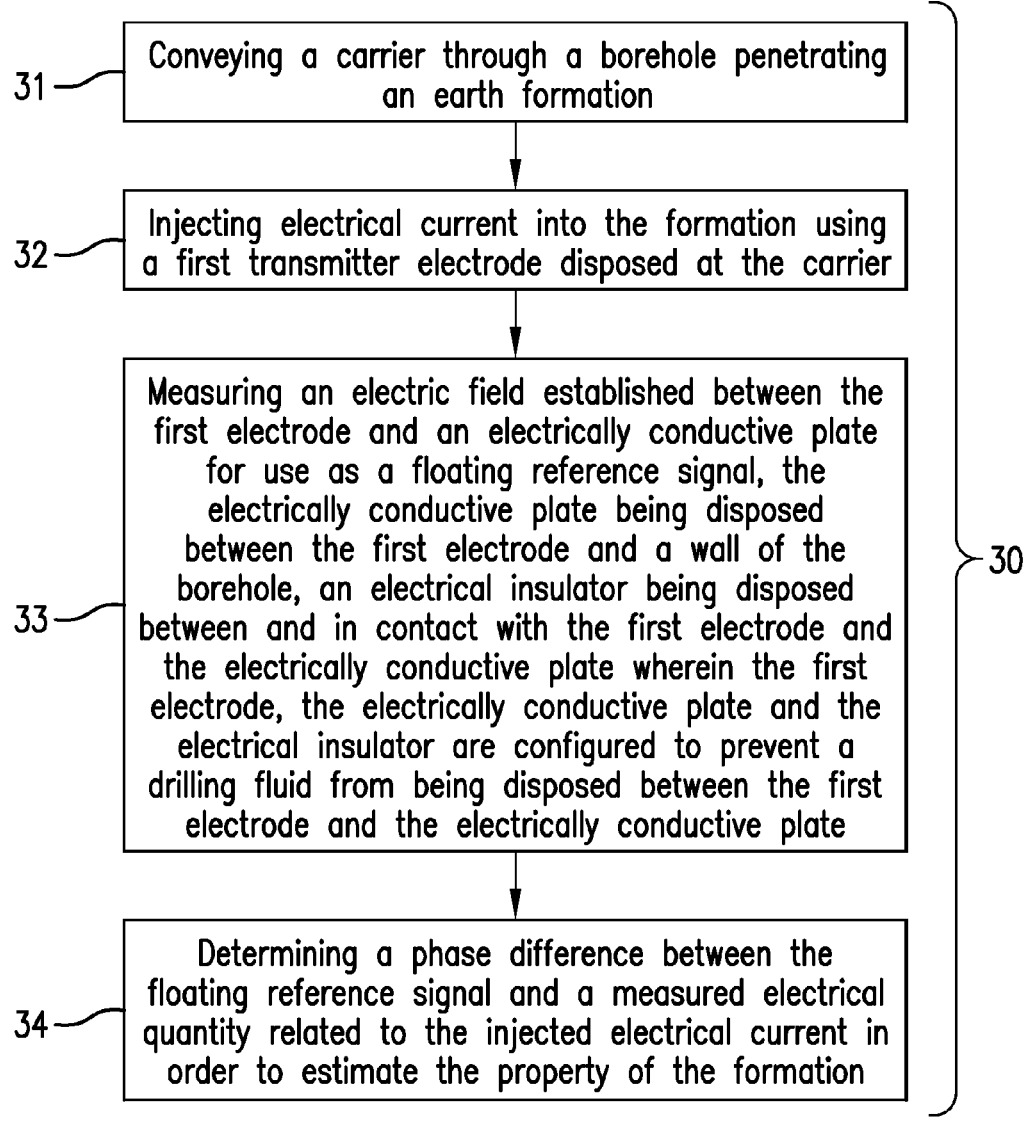
FIG. 3 presents one example of a method for estimating a property of an earth formation penetrated by a borehole containing oil-based drilling fluid.

FIG. 3 presents one example of a method 30 for estimating a property of an earth formation penetrated by a borehole containing oil-based drilling fluid. The method 30 calls for (step 31) conveying a carrier through the borehole. Further, the method 30 calls for (step 32) injecting electrical current into the formation using a first transmitter electrode disposed at the carrier. Further, the method 30 calls for (step 33) measuring an electric field established between the first electrode and an electrically conductive plate for use as a floating reference signal. The electrically conductive plate is disposed between the first electrode and a wall of the borehole. An electrical insulator is disposed between and in contact with the first electrode and the electrically conductive plate wherein the first electrode, the electrically conductive plate and the electrical insulator are configured to prevent the drilling fluid from being disposed between the first electrode and the electrically conductive plate. Further, the method 30 calls for (step 34) determining a phase difference between the floating reference signal and a measured electrical quantity related to the injected electrical current in order to estimate the property.

In support of the teachings herein, various analysis components may be used, including a digital and/or an analog system. For example, the downhole electronics 6 or the computer processing system 7 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to a first device being coupled directly to a second device or indirectly through an intermediate device.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. An apparatus for estimating a property of an earth formation penetrated by a borehole containing oil-based drilling fluid, the apparatus comprising:
   a carrier configured to be conveyed through the borehole;
   a first electrode disposed at the carrier and configured to inject electrical current at frequency $f$ into the earth formation;
   an electrically conductive plate disposed between the first electrode and a wall of the borehole;
   an electrical insulator disposed between and contacting the first electrode and the electrically conductive plate wherein the apparatus is configured to prevent the drilling fluid from entering and being disposed between the first electrode and the electrically conductive plate; and
   a processor configured to receive a measurement of the electric field to use as a floating reference signal to determine a phase difference with respect to a measured electrical quantity related to the injected electrical current in order to estimate the property.

2. The apparatus according to claim 1, wherein the first electrode, the electrical insulator, and the electrically conducting plate are disposed within a sealed chamber.

3. The apparatus according to claim 1, further comprising a sensor configured to measure an electric field established between the first electrode and the electrically conductive plate.

4. The apparatus according to claim 1, wherein the first electrode comprises a plurality of first electrodes, each first electrode associated with an individual electrically conductive plate and an individual electrical insulator disposed between and contacting the each first electrode and the individual electrically conductive plate wherein the apparatus is configured to prevent the borehole fluid from being disposed between the each first electrode and the individual electrically conductive plate.

5. The apparatus according to claim 1, wherein the processor is further configured determine the phase shift when the floating reference value is approximately zero.

6. The apparatus according to claim 1, further comprising a second electrode configured to receive electrical current injected into the earth formation by the first electrode.

7. The apparatus according to claim 6, further comprising a sensor coupled to the second electrode and configured to measure an amplitude and phase of the received electrical current.

8. The apparatus according to claim 7, wherein the electrically conductive plate comprises one electrically conductive plate that is disposed between the first and second electrodes and the wall of the borehole.

9. The apparatus according to claim 8, wherein the electrical insulator comprises one electrical insulator disposed between and in contact with the one electrically conductive plate.

10. The apparatus according to claim 1, further comprising a voltage source coupled to the first electrode and configured to inject alternating voltage at the frequency $f$ into the first electrode.

11. The apparatus according to claim 1, wherein the measured electrical quantity is alternating voltage injected into the first electrode.

12. The apparatus according to claim 1, wherein the property is resistivity or its inverse conductivity.

13. The apparatus according to claim 1, wherein the property is a location of a boundary between layers of the formation.

14. The apparatus according to claim 1, wherein the carrier comprises at least one of a wireline, a slickline, a drill string, and coiled tubing.

15. A method for estimating a property of an earth formation penetrated by a borehole containing oil-based drilling fluid, the method comprising:
   conveying a carrier through the borehole;
   injecting alternating electrical current into the formation using a first electrode disposed at the carrier;
   measuring an electric field established between the first electrode and an electrically conductive plate for use as a floating reference signal using a sensor, the electrically conductive plate being disposed between the first electrode and a wall of the borehole, an electrical insulator being disposed between and in contact with the first electrode and the electrically conductive plate wherein an apparatus comprising the first electrode, the electrically conductive plate and the electrical insulator is configured to prevent the drilling fluid from entering and being disposed between the first electrode and the electrically conductive plate; and
   determining a phase difference between the floating reference signal and a measured electrical quantity related to the injected electrical current using a processor in order to estimate the property.

16. The method according to claim 15, wherein the phase difference and the measured electrical quantity are determined when the floating reference signal is approximately zero.

17. The method according to claim 16, further comprising receiving and measuring an electrical current due to the injecting using a second electrode.

18. The method according to claim 17, wherein the measured electrical quantity is an alternating voltage applied to the first electrode and the property is estimated by dividing the measured electrical current into the measured alternating voltage.

19. A non-transitory computer readable medium comprising computer executable instructions for estimating a property of an earth formation penetrated by a borehole containing oil-based drilling fluid by implementing a method comprising:
   injecting electrical current into the formation using an electrode;
   measuring an electric field established between the first electrode and an electrically conductive plate for use as a floating reference signal, the electrically conductive plate being disposed between the first electrode and a wall of the borehole, an electrical insulator being disposed between and in contact with the first electrode and the electrically conductive plate wherein an apparatus comprising the electrode, the electrically conductive plate and the electrical insulator is configured to prevent the drilling fluid from entering and being disposed between the first electrode and the electrically conductive plate; and determining a phase difference between the floating reference signal and a measured electrical quantity related to the injected electrical current in order to estimate the property.

* * * * *